Apr. 17, 1923.
E. G. ROWLEY
PERCOLATOR
Filed Aug. 10, 1921
1,452,256
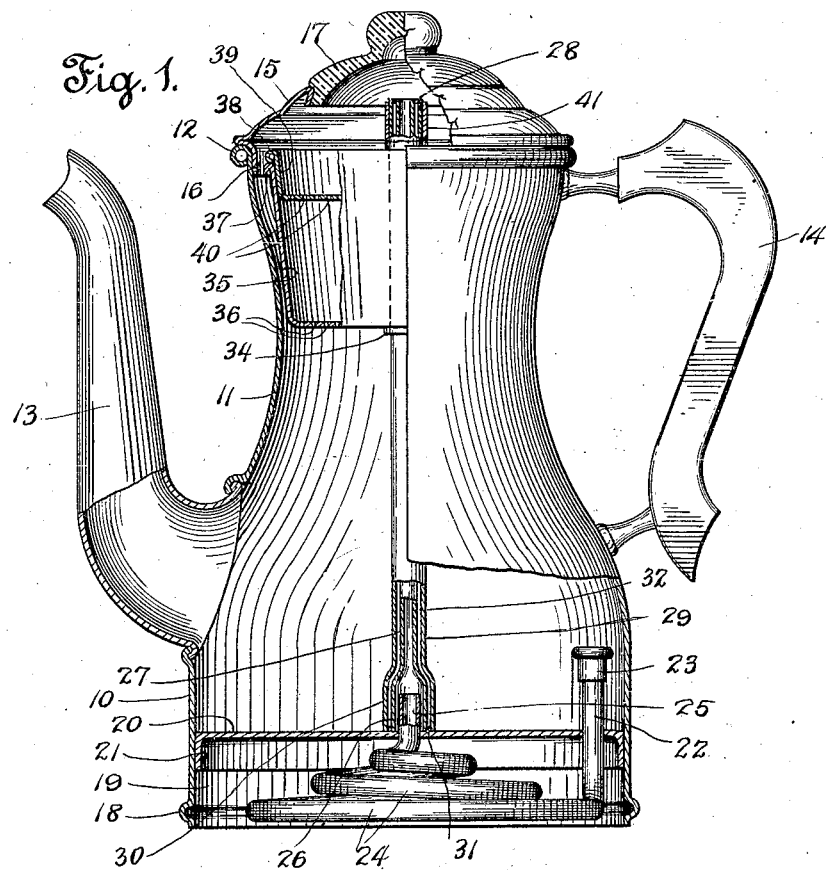
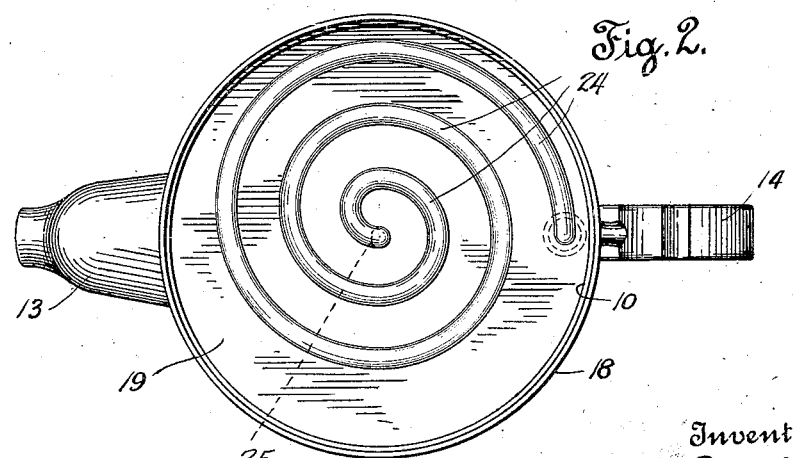
Inventor
Edward G. Rowley
By his Attorney Fred C. Fischer.

Patented Apr. 17, 1923.

1,452,256

UNITED STATES PATENT OFFICE.

EDWARD G. ROWLEY, OF NEWARK, NEW JERSEY, ASSIGNOR OF ONE-HALF TO SUN TYPEWRITER COMPANY, OF NEWARK, NEW JERSEY, A CORPORATION OF NEW JERSEY.

PERCOLATOR.

Application filed August 10, 1921. Serial No. 491,067.

*To all whom it may concern:*

Be it known that I, EDWARD G. ROWLEY, a citizen of the United States, residing at Newark, in the county of Essex and State of New Jersey, have invented new and useful Improvements in Percolators, of which the following is a specification.

The principal purpose of this invention is to produce a percolator in which beverages, particularly coffee, can be made in an exceptionally rapid manner over any ordinary source of heat which may be used.

A further object is to provide a percolator, comprising the usual handled receptacle and containing a chamber having perforate top and bottom walls for the roasted and pulverized coffee berry, the same being supported above the body of water, free from the wall of the percolator, and having a pipe coil in close proximity to the heat source, this coil communicating with the water in the percolator, which passes through a check valve and is also connected at its opposite end with the hollow tubular support for the coffee chamber, thus producing immediate results not attainable where space or solid metal intervenes.

These and other like objects which will become more fully apparent as the description progresses, are attained by the novel construction, combination and arrangement of parts hereinafter described and shown in the accompanying drawing, forming an essential part of this disclosure, and in which:—

Figure 1 is a partial side elevational, partial sectional view of a percolator made in accordance with the invention.

Figure 2 is a bottom plan view of the same.

In the drawing the numeral 10 designates the lower cylindrical base portion of the percolator pot or receptacle, from whence rises a contracted body part 11 terminating in a beaded top 12.

A spout 13 communicates with the interior of the pot on one side and a handle 14 is firmly engaged on the opposite side.

A cover 15 engages with the beaded portion 12 by an annular flange 16, this cover being dome shaped and carrying at its top a transparent cap 17, the construction being common to percolators of this type.

Near the bottom of the base 10 is a circumferential outwardly extending rib or bead 18 for stiffening purposes, and above the lower edge of the base is an open space 19 covered by a plate 20, held by its flange 21, and forming the bottom of the pot.

Fixed rigidly in the plate 20 is a vertical tube 22, having connected to its upper extending end a check valve 23 so arranged as to permit the entrance of liquid from the body of the pot into the tube but prevent a reverse flow.

The lower end of the tube, which passes through the plate adjacent the wall of the pot, extends nearly to its bottom edge and is bent at a right angle and merged into spiral coils 24, the inner coils being raised, and terminate in an open end 25 bent upwardly and extended through the center of the plate 20, in which it is firmly secured.

Loosely fitting the extended end 25 is the expanded element 26 of an inner tube 27 extending upward in the center of the pot to a point substantially level with the lower edge of the glass cap 17.

Surrounding the tube 27 and joined to it by an impervious washer 28 is an outer tube 29 having an expanded end 30, connected by a similar washer 31, there being a space 32 between the tubes which acts as non-conductor for heat or cold in passing from one tube to the other.

A flanged collar 34 on the outer tube constitutes a seat for the coffee holding receptacle 35, the same having perforations 36 in its bottom wall and a beaded edge 37 on which rests the bead 38 of a cover 39 fitted to the receptacle 35.

This cover extends down into the receptacle and has perforations 40 in its bottom in which is an opening for a tube 41 loosely fitting over the tube 29 and acting as a handle for the receptacle 35 in which it is fixed.

In operation, the non-conducting tubes being entered in the body of the receptacle to rest on the plate 20, surrounding the tube 25, the body is supplied with any desired quantity of water, the receptacle 35 entered over the tube 29, supplied with coffee and the cover 39 placed over the receptacle, preventing loss of aroma and also the dissipation of steam.

The cap 15 is then positioned and the percolator placed over the heating apparatus used.

Water passes through the valve 23 filling the coil 24 and is instantly heated, causing it to pass upward in the tube 27, the stream striking the under surface of the cap 17, and being deflected thereby, passes through the cover perforations 40, saturating the coffee in the receptacle 35, the essence of the coffee percolating through the perforations 36 commingling with the water in the body of the percolator.

As the valve 23 prevents water from passing from the coil direct to the body of the percolator it will be seen that a circulation is maintained so long as heat is applied.

Due to the air space between the tubes 27 and 29 the water from the coil is delivered to the coffee in an extremely hot condition, not materially affected by the body of water in the pot, and, as will be observed, the coils being close to the heat source, the small quantity in them is rapidly heated, while the coils, being enclosed, utilize the heat transmitted advantageously.

Although the foregoing is descriptive of the preferred embodiment of the invention, it will be apparent that minor changes may be made in its construction, without the exercise of invention, or conflicting with the scope of the claims hereto appended.

Having thus described my invention, what I claim as new and desire to secure by Letters Patent, is:—

1. A percolator comprising a body having its walls extended below the bottom thereof, a heating coil in the space below the bottom, said coil having its end elements extending into said body, and a tube removably engaging one of the end elements, said tube extending centrally to the upper part of said body.

2. A percolator comprising a hollow body having a raised bottom plate, a coil for circulating liquid in said body, said coil being below said plate, and adapted to receive heat, an inner tube removably engaging one of the ends of said circulating coil, an outer tube spaced from said inner tube, and impervious connections between said tubes at the ends thereof.

3. A percolator comprising a body having its walls extended below the bottom thereof, a heating coil in the space below the bottom, said coil having its end elements extending into said body, a check valve on one of said end elements, and a tube removably engaging the other end element, said tube extending centrally to the upper part of said body.

4. A percolator comprising a hollow body having a raised bottom plate, a coil for circulating liquid in said body, said coil being below said plate, and adapted to receive heat, an inner tube removably engaging one of the ends of said circulating coil, an outer tube spaced from said inner tube, impervious connections between said tubes at the ends thereof, and means on said outer tube for supporting a container interiorly said body.

5. A percolator comprising a body having a handle, spout and cover, a bottom plate above the lower edge of the percolator body, a perforate container in the upper portion of said body, a tubular support therefor, a pipe coil disposed in the space below said plate, the ends of said coil projecting fixedly therethrough, one of the ends of said coil loosely engaging in said support, and a check valve fixed on the other end.

6. A percolator comprising a hollow body having a handle, spout and cover, a raised bottom plate in said body, a heating coil disposed therebelow, the ends of said coil projecting through said plate, a check valve on one of said ends, the other end acting as a guide at the center of the plate, a pair of annularly spaced tubes having expanded ends loosely fitting guide, said tubes being imperviously connected at their ends, a collar fixed to the outer of said tubes, and a perforate container supported on said collar.

7. A percolator comprising a hollow body having a handle, spout and cover, a bottom plate fixed in said body midway between its lower edge and the opening to said spout, a tube passing through said plate, a check valve on the upper end of said tube, a spiral coil formed by said tube disposed below said plate within the confines of the said body said coil terminating centrally of and extending through said plate, a tube having an expanded end adapted to rest on said plate over the central extending end of said coil, and a perforate container supported by the last named tube in the upper part of said body.

This specification signed and witnessed this ninth day of August, 1921.

EDWARD G. ROWLEY.

Witnesses:
 FRED'K C. FISCHER,
 YETTA BLANK.